C. A. JUENGST.
DELIVERY MECHANISM FOR SIGNATURE GATHERING OR OTHER MACHINES.
APPLICATION FILED AUG. 11, 1908.
1,126,026. Patented Jan. 26, 1915.
6 SHEETS—SHEET 4.
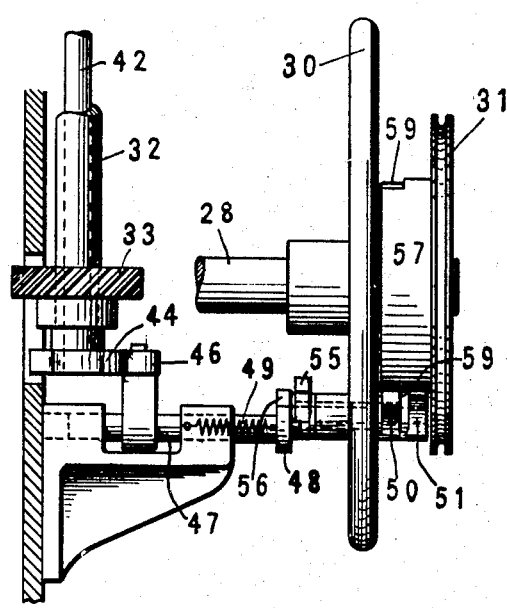
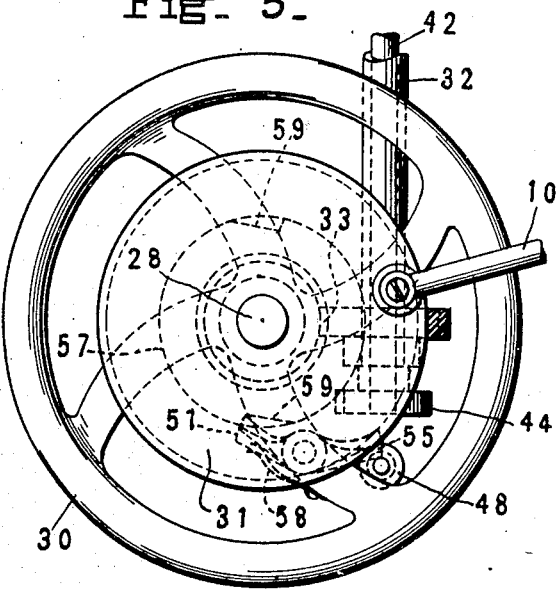
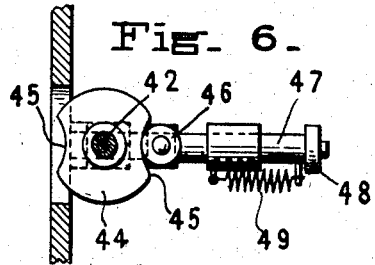
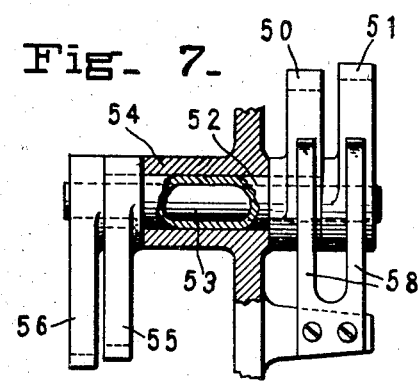
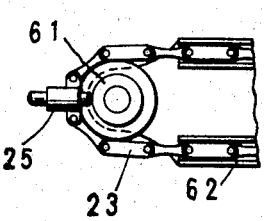
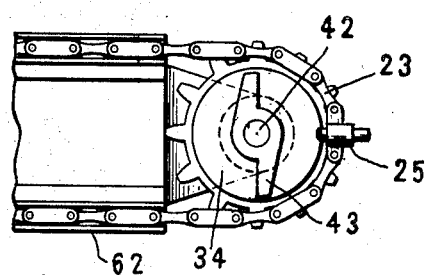
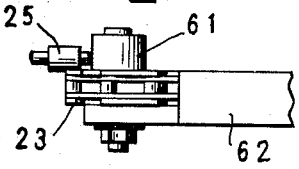
WITNESSES:
INVENTOR
Charles A. Juengst.
BY
Brock Beeken Smith
ATTORNEYS

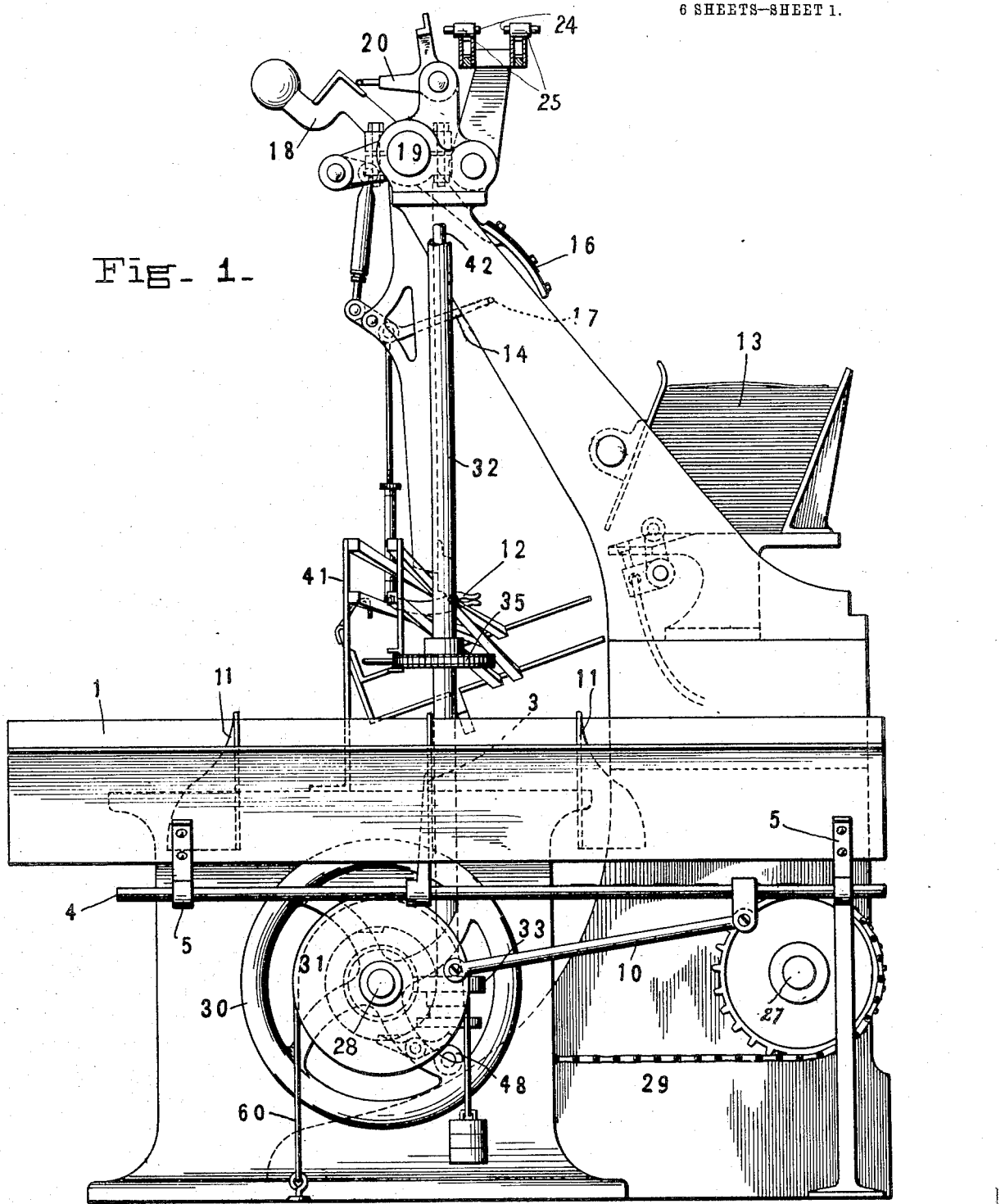

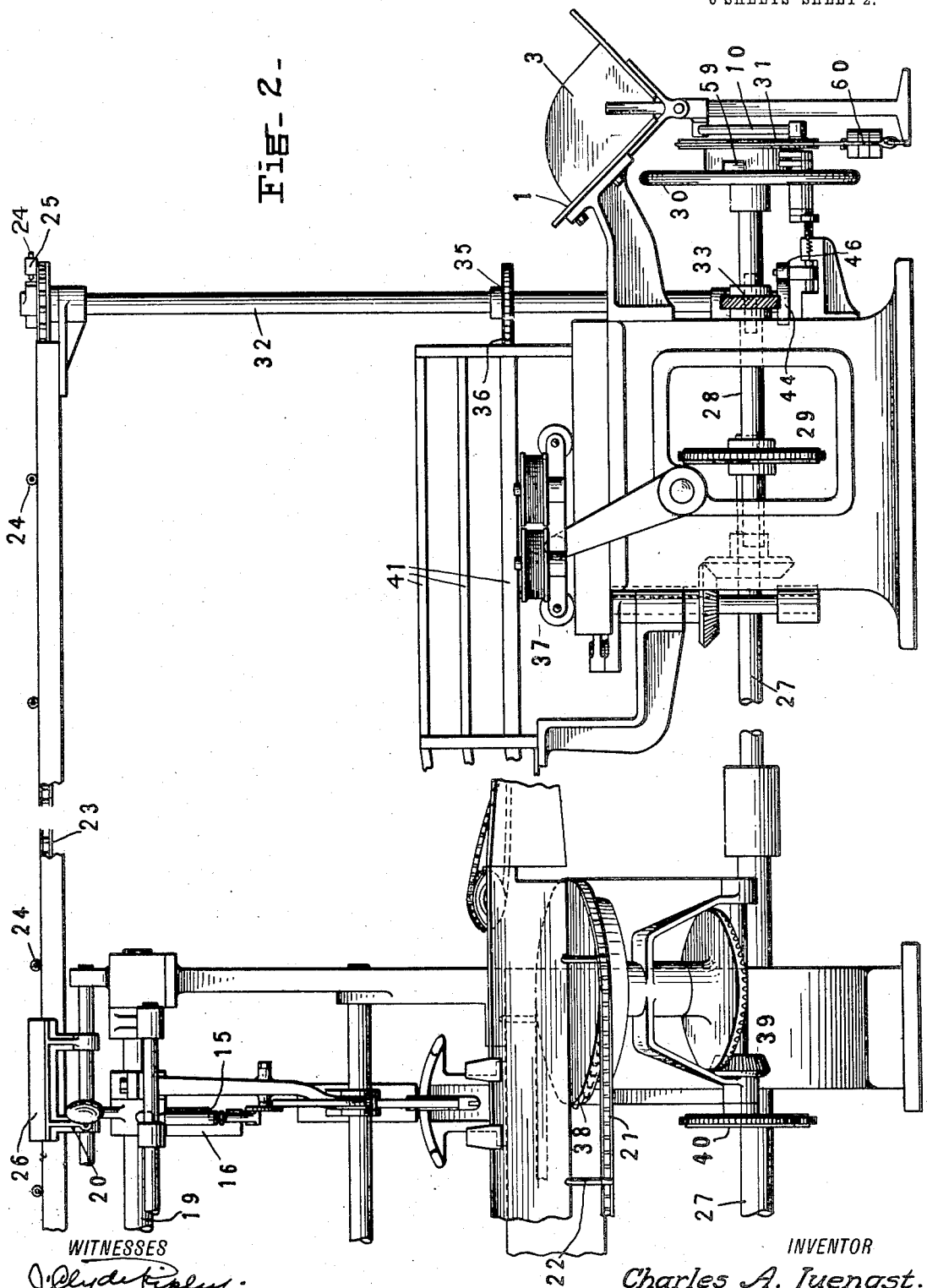

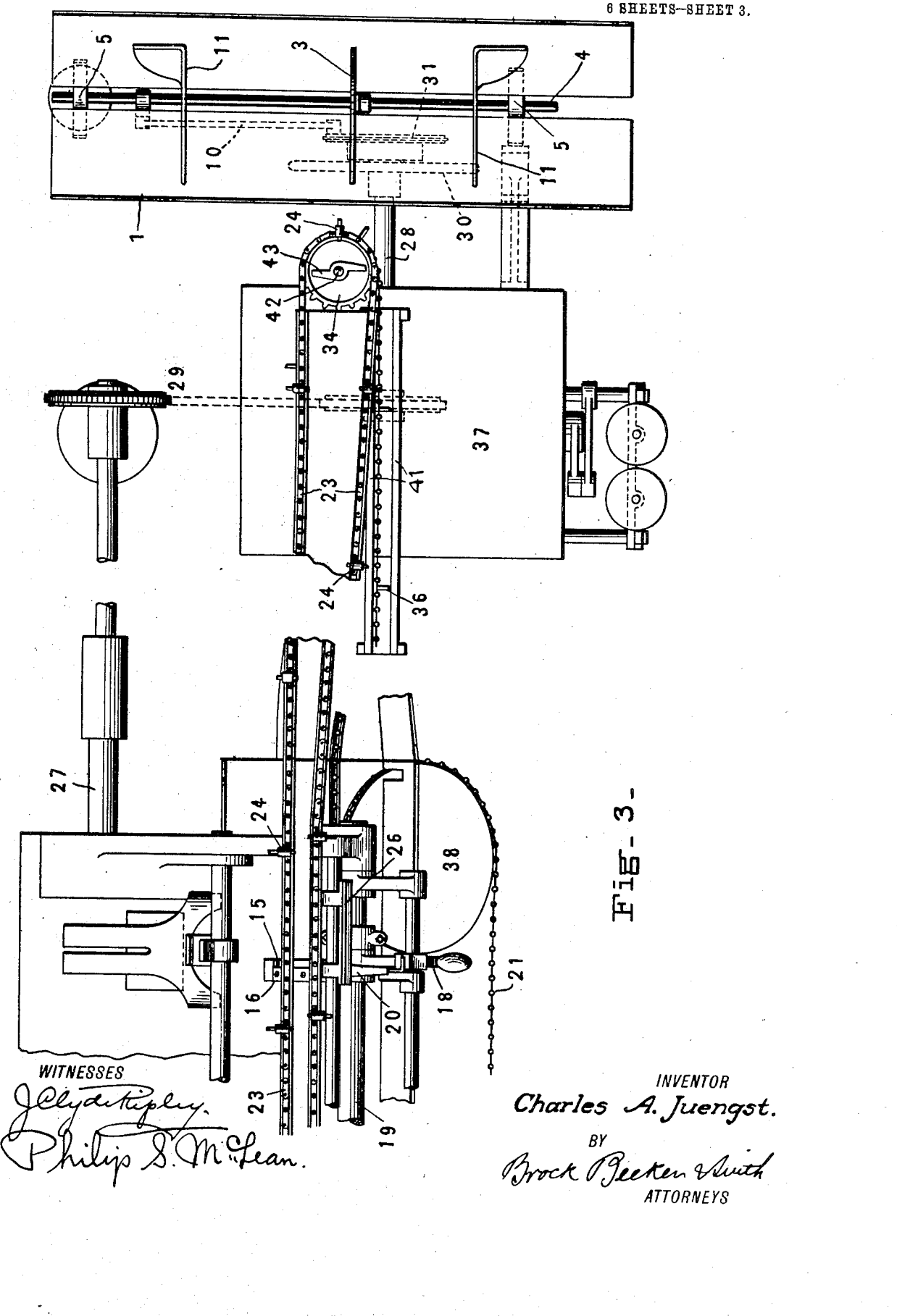

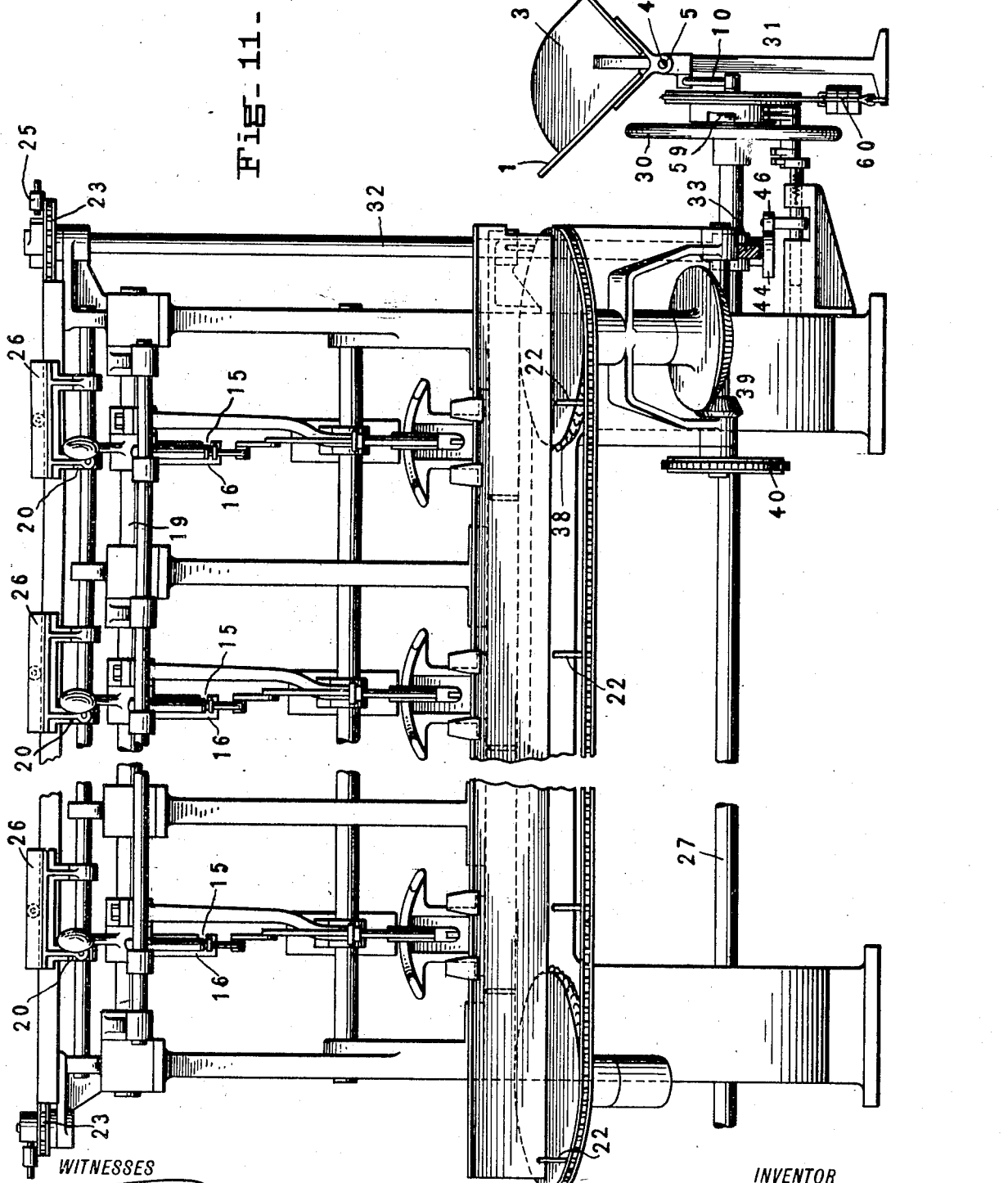

C. A. JUENGST.
DELIVERY MECHANISM FOR SIGNATURE GATHERING OR OTHER MACHINES.
APPLICATION FILED AUG. 11, 1908.
1,126,026.
Patented Jan. 26, 1915.
6 SHEETS—SHEET 6.
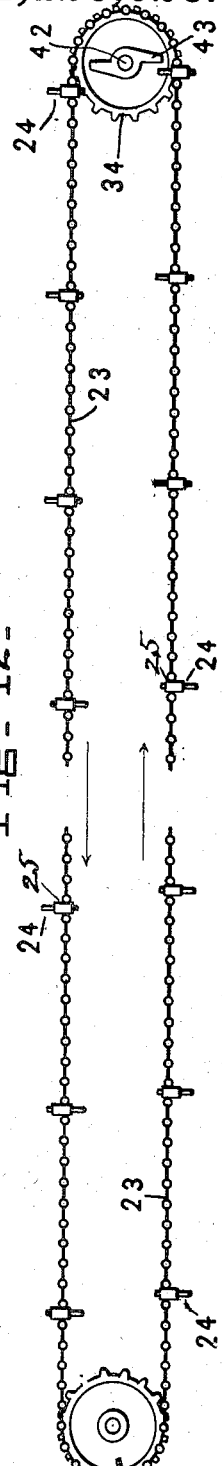
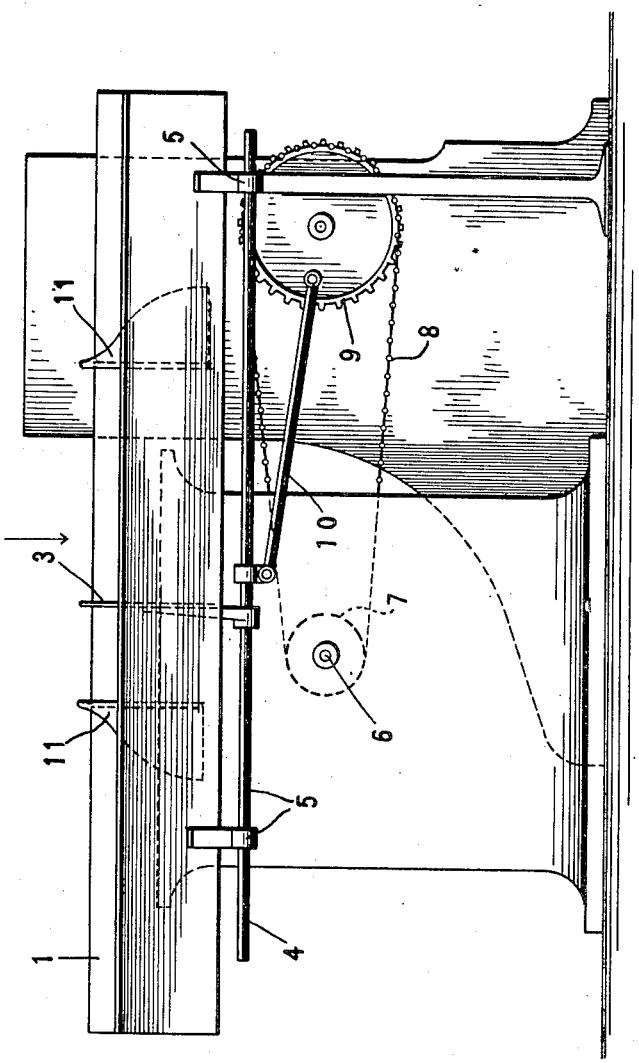
WITNESSES
INVENTOR
Charles A. Juengst.
BY
Brock Beeken Smith
ATTORNEYS

UNITED STATES PATENT OFFICE.

CHARLES A. JUENGST, OF CROTON FALLS, NEW YORK.

DELIVERY MECHANISM FOR SIGNATURE-GATHERING OR OTHER MACHINES.

1,126,026.  Specification of Letters Patent.  Patented Jan. 26, 1915.

Application filed August 11, 1908. Serial No. 447,977.

*To all whom it may concern:*

Be it known that I, CHARLES A. JUENGST, a citizen of the United States, and resident of Croton Falls, in the county of Westchester and State of New York, have invented certain new and useful Improvements in Delivery Mechanisms for Signature-Gathering or other Machines, of which the following is a specification.

The present invention relates generally to delivery mechanism, and has more specifically reference to a combined sorting and delivery mechanism particularly applicable for use in connection with a suitable collecting mechanism, such as a signature gathering machine, for the purpose of detecting defective or improperly positioned articles and separating such defective or improperly positioned articles from the perfect or correctly placed articles.

One object of the invention resides in producing a structure capable of delivering the article or articles received in two directions.

Another object of the invention resides in separating or sorting perfect and imperfect articles from each other, in say a signature gathering machine.

Other objects will appear as the specification proceeds.

In carrying out these objects, one feature of the invention consists in a delivery mechanism comprising a receiving member adapted to receive the article or articles, such as books, to be delivered, at a certain point, a separating member adapted to travel back and forth past the point at which the article is received and capable of delivering the article in opposite directions, together with actuating means for said separating member capacitated to variably position the separating member with reference to the article received, at the moment it is received, such position of the separating member with reference to the article determining the direction in which the article is delivered. Preferably the receiving member is in the form of a trough-like structure extending substantially in a horizontal direction, while the separating member in the form disclosed is given a reciprocating motion whose stroke is uniform. The receiving point of the article is preferably located substantially central of the receiving member, or at a point substantially half way between the ends of the stroke of the reciprocating member. The actuating means may be of any suitable construction, but in the preferred form and for the purpose of certain claims, acts to vary the timing of the stroke of the reciprocating member so as to deliver the article either in one or the other direction.

Another feature of the invention resides in a delivery means, the actuating means of which normally delivers the article in one direction, and an interrupting means which acts upon the actuating means to interrupt its normal operation so as to deliver the article in another direction. Preferably this interrupting means is normally inoperative so as not to affect the operation of the actuating means, but, when properly positioned, acts to interrupt the normal operation of the actuating means. In this instance it affects the operation of the actuating means by varying the timing of the same.

For the purpose of varying the timing of the actuating means, clutch mechanism under the control of the interrupting means could be employed, and for the purpose of certain claims this clutch mechanism could take the form of dogs carried by a driving member and adapted to engage a driven member, there being tripping means for the dogs adapted to be actuated by the interrupting means.

The delivery mechanism may be, and preferably is, utilized as a sorting mechanism by placing suitable means, such as the interrupting means, under the control of a detector mechanism so that the interrupting means will be operated, when a misplaced or improperly positioned article or articles are detected—or when the absence of an article or the delivery of too many articles is detected, which will cause the delivery mechanism to sort the perfect from the imperfect article or articles. For the purpose of certain claims covering this feature broadly, the invention is not to be limited to the preceding paragraphs of the statement of invention.

In the more preferred embodiment of the invention, I contemplate the employment of a traveling interrupting means moving in synchronism with the article and adapted to be positioned by the detector device and to act to interrupt the normal operation of the actuating means for the delivery mechanism. This feature is especially valuable in signature gathering machines, and when the invention is so employed, the detector mechanism will detect imperfections in the signatures as they are gathered and, through the traveling interrupting means, will transmit an impulse which acts to cause the delivery mechanism to sort the book containing a wrongly positioned signature or signatures, or a book having a certain signature or signatures absent therefrom or of an improper thickness, or a book having too many of the same signatures from the books containing perfect signatures. By "imperfections" I mean not only "defective" signatures, which may be either too thick or too thin, as containing too many or too few pages, but also misplaced or reversed signatures, and even imperfections in the feeding of the signatures, as when a signature is missed, or too many signatures are taken. The terms "imperfection" and "defective" are to be construed accordingly in the specification and claims. The detector mechanism for detecting these various conditions which I have broadly styled "imperfections" may be of any suitable construction, such as that shown in United States Letters Patent No. 761,496.

In signature gathering machines as used at the present time, the machine is caused to stop when a signature of improper thickness or one that has been misplaced or improperly positioned is taken. If the article or articles are of a poor quality, such stopping becomes so frequent at times as to rob the machine of its speed. When running certain articles it is therefore cheaper to have a constantly operating machine and to sort the article or articles of improper thickness from the perfect article or articles at the end of the machine. The word "constantly" as here used is not intended to preclude the employment of an intermittently operating conveyer in the gathering or other collecting machine, or mechanism. The delivery mechanism used, in the preferred form therefore constitutes a stacker which will stack the articles, as books, in two directions horizontally.

The drawings illustrate the preferred embodiment of the invention as associated with a signature gathering machine, and in said drawings:

Figure 1, is a side view of the invention as applied to a signature gathering machine and operating in connection with the machine to sort the above-mentioned imperfect books from the perfect books. Fig. 2, is a side elevation of the signature gathering machine equipped with my improvements, with parts broken away. Fig. 3 is a plan view of the same. Fig. 4, is a broken enlarged detail view of the crank or driven member, the driving member for the same, and the clutch devices between these two parts. Fig. 5, is a view of the same parts taken on a plane at right angles to that of Fig. 4. Fig. 6, is a broken detail view of the cam and trip member for actuating the clutch members. Fig. 7, is a detached detail view of the dogs or pawls constituting the clutch members previously referred to, parts being shown in section. Fig. 8, is a broken plan view of the inner end of the interrupting device, showing the means for restoring the trip members carried thereby to their normal inoperative position. Fig. 9, is a similar view of the opposite or active end of the interrupting device, showing the upper end of the cam shaft with the double-ended dog thereon which is adapted to be engaged by the extensible elements or trip members of the interrupting device. Fig. 10, is a side elevation of that portion of the interrupting device and restoring mechanism illustrated in Fig. 8. Fig. 11, is a side elevation of a signature gathering machine with my invention applied thereto, the machine in this case differing from the one shown in Fig. 2, in that the stitching mechanism is omitted. Fig. 12, is a plan view of a modified form of interrupting mechanism adapted to cause the delivery mechanism to deliver the articles in both directions. Fig. 13, is a side elevation of a slight modification of the invention, in which the mechanism is adapted to alternately sort and stack the articles to both sides.

Like reference characters refer to similar parts throughout the several views.

The numeral 1, designates the sorting trough or receiving member which receives the articles to be sorted or delivered, this member being so mounted as to properly receive such articles from the signature gathering or other machine. This is preferably done as shown in the drawings, by mounting the receiving member at the end of the machines and at right angles with respect to the conveyer of the machine. A sorting member 3, is mounted to reciprocate in the receiving member past the point at which the articles are received. The sorting member is preferably in the form of a blade and may be carried in any suitable way, as by mounting it upon a rod 4, which is adapted to reciprocate in the brackets or guides 5. The sorting member may be driven in a number of ways. When used simply to stack the articles or to deliver them alternately to both sides, the sorter would preferably be operated as shown in Fig. 13. Here the power is transmitted from the main power shaft (not shown in this figure) to a countershaft 6, the sprocket wheel 7 on said shaft and the sprocket chain 8 conveying a slower motion to the larger sprocket wheel 9, which latter sprocket wheel serves also as a crank member, the crank rod 10 transmitting a reciprocating motion from the crank sprocket to the support which carries the sorter. In this way the sorter would be given a regular reciprocating movement. The books or other articles would be fed to the approximate center of the receiving member, at the point marked X and the sorter would be timed to be on opposite sides of this point of reception each time an article was received, so that in traveling past the point at which the articles were received, the sorter would alternately deliver the articles to opposite ends of the receiving member and thereby stack them evenly in two separate piles. When the articles handled were books, followers or supports 11 would have to be mounted in the receiving member to prevent the piles of books from falling over, that is, to hold them standing on edge. Preferably these followers would be frictionally held in place, simply resting in the trough-shaped member and being moved over after the reception of each book by the action of the sorter. If desired, the sorting member could be adjustably mounted upon its reciprocating support. When the sorter mechanism is used to separate the defective or misplaced articles from the perfect or properly placed ones, a detector mechanism has to be employed, also means for interrupting the normal or regular operation of the sorting device. The preferred form of these devices is shown in Figs. 1 to 11, inclusively. In these views, grippers 12, of a well-known type are illustrated, these grippers being more fully described in certain patents which have been granted to me. The grippers are adjusted to grip the lowermost signature of the pile of signatures 13, and if the signature is defective, as by being too thick or too thin, or if the gripper fails to seize the signature and a signature is therefore wholly absent, if the signature is misplaced or reversed, or if too many signatures are taken, the detector finger 14, which under normal conditions is adapted to pass through the opening 15, in the detector plate 16, fails to properly register with said opening and the hook 17 on the end of the detector finger engages with the detector plate. This mechanism for detecting variations in the thickness of the signatures is more particularly described and claimed in my Patent No. 761,496 of May 31, 1904. This detector plate is carried by the arm 18, loosely mounted on the shaft 19, so that when the plate is engaged by the hook on the detector finger, as the gripper swings back, the upper end of the arm is tilted forward, engaging the outer end of the bell crank lever 20 and rocking the upstanding portion of the bell crank lever inward. This operation will be best understood by reference to Fig. 1.

The conveyer 21 of the machine is divided into compartments in the usual way to receive the signatures from the grippers. The so-called compartments may be formed in a very simple manner by providing the conveyer with a number of division pins 22. The operation of a signature gathering machine being so well known, it is only necessary for the purpose of this invention to state here that the conveyer travels in correspondence with the action of the grippers, so that by the time the compartments reach the end of the machine, they each contain a full book, provided of course that the signatures have all been perfect.

In the introduction to the specification, it was stated that instead of stopping the machine each time a defective signature or some other imperfection was detected, under some conditions it was preferable to allow the machine to run on and separate the defective book from the perfect ones at the end of the machine. In order to accomplish this result, some means of connection has to be provided between the detectors and the sorting mechanism to cause the sorting mechanism to act in accordance with the action of the detectors, in other words, to interrupt the normal operation of the sorting mechanism. The device for accomplishing this correspondence of action between the two parts, I have styled an interrupting device, and in the present instance this consists preferably of an endless chain 23, traveling in synchronism with the conveyer and having trip members 24, corresponding in movement with the compartments of the conveyer. These trip members are preferably in the form of extendible pins, slidably held in the bushings 25, on the chain. When the bell crank levers are rocked due to the action of the detectors in the manner previously described, the upper portion of the crank will engage the trip member and push the same inward. These upper contact portions of the bell cranks are lengthened out as at 26, so as to properly engage the trip member while the chain is in motion. The trip element which has been projected inward then travels along in synchronism with the compartment of the conveyer which contains the faulty signature.

Power is transmitted from the main power shaft 27, of the machine to the sorter mechanism shaft 28, by means of sprocket connection 29, or other suitable means. A wheel or driving member 30 is fixedly mounted on this shaft and alongside of this fixed member is a loose crank disk or member 31. A crank rod 10, connects the crank member to the support of the sorter blade, the blade being preferably mounted in the manner before described. An upright tubular shaft 32, is driven from the shaft of the sorter mechanism preferably by means of the intermeshing gears 33, this shaft carrying at its upper end the sprocket 34 for the interrupter chain and also carrying a sprocket 35 which operates the auxiliary conveyer 36. This auxiliary conveyer receives the books from the main conveyer and carries the books through the stitching mechanism 37 (in Fig. 2) to the sorting mechanism, the auxiliary conveyer moving in synchronism with the main conveyer as well as with the interrupting means. When the stitching mechanism is omitted, as is the case in Fig. 11, an auxiliary conveyer or a guide would probably be necessary to carry the books from the main conveyer to the delivery mechanism. (For the sake of clearness, this device is not shown). The main conveyer is preferably operated by a sprocket 38, driven by the bevel gear connection 39 and sprocket chain 40, from the power shaft. The usual guides 41, Figs. 1, 2 and 3, are employed for directing the movement of the books through the stitching mechanism, when this mechanism is used. Within the tubular shaft is mounted a shaft 42, carrying a double-ended dog 43, at its upper end, which is adapted to be engaged by the trip members of the interrupting means when such members have been acted upon by the bell cranks. On its lower end this shaft carries a cam 44, having oppositely disposed recesses 45 to normally seat the cam roller 46 on the inner end of the plunger 47, these parts being well shown in Fig. 6. At its outer end the plunger carries a roller 48 and the plunger is held to its innermost position and in engagement with the cam by the spring 49.

The clutch members between the driving member and the crank member 31 of the sorter mechanism, consist preferably as illustrated in detail in Fig. 7, of an inner dog or pawl 50 and an outer dog or pawl 51, the inner dog being on a sleeve 52 and the outer one on a pin or shaft 53, contained within the sleeve, both pin and sleeve being carried in the bushing 54 of the driving member. The inner and outer dogs are controlled and operated by the tails or lugs 55 and 56, on the inner ends of the sleeve and pin respectively. The crank member has a widened rim 57, against which the dogs would normally be held by means of springs 58, or like devices. In the rim of the crank member are formed diametrically opposite ratchet notches or seats 59, the notches being offset laterally, one from the other so as to be engaged by the respective dogs.

In the normal operation of the parts, the books or other articles are fed to the receiving member of the sorting mechanism and the sorter is so timed as to be approximately at one end of its stroke when the books are received so as to receive the books at its front side and deliver the books at the opposite end of the receiving member. When a signature of improper thickness is detected, the corresponding tripping member of the interrupting mechanism is acted upon by the bell crank and the member so acted upon travels along and reaches the sorting mechanism at the same time with the book containing the defective signature or which is imperfect in some other way. When the tripping member reaches this point, it engages one end of the double ended dog on the upright cam shaft and imparts a half revolution to the cam shaft, turning the cam on said shaft a half revolution. This movement of the cam forces the plunger outward and the roller on the outer end of the plunger engages the tail of the inner dog (which is normally in engagement with its seat in the crank member, serving as the driving clutch connection between the driving and driven members) thereby lifting the active dog from engagement with the crank member, breaking the driving connection between the two parts, and the brake band 60, acting on the crank member, causes the parts of the sorting member to be stopped instantly, and before the sorting blade has started on its return movement. A book is received by the receiving member while the sorter blade is stopped in this position on the wrong side of the point at which the books are received. The driving member turns an idle half revolution, the outside dog, which was formerly idle, engages its seat in the crank member and the crank member is again put in motion, the sorting blade starting its return movement and carrying the book just received in the opposite direction to that in which the other perfect books were delivered. The cam has been turning all this time and by the time that the tails of the clutch dogs are again in position to be engaged by the tripping roller on the plunger, the cam has completed its half revolution, allowing the plunger to return inward under pressure of the spring, to its first position. The trip roller then engages the other dog (which has been temporarily active for a half revolution), freeing said dog, and permitting another idle half revolution of the driving member, and a reëngagement of the inner dog (which is the normally-active driving dog), and the book just received, provided it is perfect, is delivered by the sorter to the proper pile. These tripping operations cause a change in the timing of the sorter blade so that the blade receives the imperfect book on the opposite side from that at which it usually receives the perfect books, so that the imperfect book is delivered in a direction opposite to that of the normal perfect-book delivery and the timing of the sorter is immediately thereafter restored to normal so as to deliver the books in the normal direction. It will be understood that the normally inactive dog is tripped once to each revolution, but this has no effect on the other parts. Other clutch devices than the ones described might of course be used to accomplish these results. While books have been considered throughout this description of the operation of the device, it will be understood that other articles would be treated in the same manner.

The tripping members of the interrupting device have to be restored to their normal inoperative position in some way, and this is preferably done by means of a roller 61 illustrated in Figs. 8 and 10, around which the interrupter chain passes, the roller being so disposed as to be engaged by the pins which have been acted upon, and to push such pins out to their normal position. The sides of the interrupter chain are preferably supported and protected by a casing 62.

If it is desired to have the sorter deliver the articles alternately in both directions, the restoring device would be omitted and the tripping members of the interrupting device would be arranged after the manner shown in Fig. 12. In this view, the pins are shown arranged alternately three in and three out. They would therefore act upon the sorting mechanism in the manner before described to cause the sorting mechanism to alternately deliver the articles three to each side. If desired by simply varying the number and arrangement of the pins, the sorting mechanism could be operated in any desired way.

What is claimed, is:

1. A delivery mechanism comprising a receiving member adapted to receive the article to be delivered at a certain point, a separating member adapted to travel back and forth past the point at which the article is received and capable of delivering the article in opposite directions, and actuating means for said separating member capacitated to normally position the separating member to one side with reference to the article received at the moment it is received, and under certain abnormal conditions to position the separating member at the other side of the article at the moment it is received.

2. A delivery mechanism comprising a receiving member adapted to receive the article to be delivered at a central point, a separating member adapted to travel back and forth past the point at which the article is received and capable of delivering the article in opposite directions, and actuating means for said separating member capacitated to normally position the separating member to one side with reference to the article received at the moment it is received, and under certain abnormal conditions to position the separating member at the other side of the article at the moment it is received.

3. A delivery mechanism comprising a receiving member arranged in a substantially horizontal plane and adapted to receive the article to be delivered at a certain point, a separating member adapted to travel back and forth past the point at which the article is received and capable of delivering the article in opposite directions, and actuating means for said separating member capacitated to normally position the separating member to one side with reference to the article received at the moment it is received, and under certain abnormal conditions to position the separating member at the other side of the article at the moment it is received.

4. A delivery mechanism comprising a receiving member adapted to receive the article to be delivered at a certain point, a reciprocating member adapted to travel back and forth past the point at which the article is received and capable of delivering the article in opposite directions, and actuating means for said separating member capacitated to normally position the separating member to one side with reference to the article received at the moment it is received, and under certain abnormal conditions to position the separating member at the other side of the article at the moment it is received.

5. A delivery mechanism comprising a trough adapted to receive the article to be delivered at a certain point, a separating member adapted to travel back and forth past the point at which the article is received and capable of delivering the article in opposite directions, and actuating means for said separating member capacitated to normally position the separating member to one side with reference to the article received at the moment it is received, and under certain abnormal conditions to position the separating member at the other side of the article at the moment it is received.

6. A delivery mechanism comprising in combination with a conveyer, a receiving member adapted to receive the article to be delivered from the conveyer at a certain point, a separating member adapted to travel back and forth past the point at which the article is received and capable of delivering the article in opposite directions, and actuating means for said separating member capacitated to normally position the separating member to one side with reference to the article received at the moment it is received, and under certain abnormal conditions to position the separating member at the other side of the article at the moment it is received.

7. Delivery mechanism comprising in combination with a conveyer adapted to deliver articles at regular intervals, a receiving member adapted to receive the article to be delivered from the conveyer at a certain point, a separating member adapted to travel back and forth past the point at which the article is received and capable of delivering the article in opposite directions, and actuating means for said separating member capacitated to normally position the separating member to one side with reference to the article received at the moment it is received, and under certain abnormal conditions to position the separating member at the other side of the article at the moment it is received.

8. A delivery mechanism comprising a receiving member adapted to receive the article to be delivered at a certain point, a separating member traveling back and forth past the point at which the article is received and capable of delivering the article in opposite directions, actuating means for said separating member, and means for variably timing the actuating means to vary the position of the separating means with reference to the point at which the article is received at the time the product is received so as to deliver the product in either direction.

9. Delivery mechanism comprising a receiving member adapted to receive the article to be delivered at a certain point, a separating member adapted to travel back and forth past the point at which the article is received and capable of delivering the article in opposite directions, actuating means for said separating member capacitated to variably position the separating member with reference to the article received at the moment it is received, such position of the separating member with reference to the article determining the direction in which the article is delivered, and tripping means for interrupting the operation of the actuating means.

10. A delivery mechanism comprising in combination with a conveyer, a receiving member adapted to receive the article to be delivered at a certain point from the conveyer, a separating member traveling back-and-forth past the point at which the article is received and adapted to deliver the article in either direction, actuating means for said separating member, and means for variably timing the actuating means to vary the position of the separating member with reference to the point at which the article is received at the time the article is received so as to deliver the article in either direction.

11. In combination, a sorting mechanism, means for delivering articles to the sorting mechanism, actuating means normally causing the sorting mechanism to deliver the product received in one direction, means for detecting variations in thickness of the article before it reaches the sorting mechanism, interrupting devices normally inoperative traveling between the detector and the actuating means of the sorter and the motion of which is in synchronism with the article delivering means, adapted to be operatively acted upon by the detector when the article is defective so as to interrupt the operation of the actuating means for the sorter thereby causing the sorter to deliver the defective product in another direction, 12. A sorting mechanism, actuating means normally causing the sorting mechanism to deliver the article received in one direction, means for feeding the article to the sorting mechanism, and means for detecting variations in thickness of the article before it reaches the sorting mechanism adapted to act when the defective article reaches the sorting mechanism to control the actuating means to cause the sorting mechanism to deliver the defective article in another direction.

13. In combination, a book sorting mechanism, actuating means normally causing the book sorting mechanism to deliver books in one direction, signature gathering means, means for detecting signatures of improper thickness as they are being gathered, and means for controlling the actuating means from the detecting means to cause the book sorting mechanism to deliver the book having certain signatures absent or too many thereof, or containing misplaced signatures or signatures of improper thickness in another direction.

14. The combination with signature gathering means, of means for detecting variations in thickness of the signatures as they are being gathered, and automatic means, located at the end of the machine and controlled by the detecting means, for separating the books containing signatures of improper thickness from the perfect books.

15. The combination with a signature gathering machine, of means for detecting variations in thickness of the signatures as they are being gathered, and automatic means for separating the books having the defective signatures from the perfect books after the signatures are gathered.

16. The combination with a signature gathering machine, of means for receiving the books gathered by the machine and for automatically separating defective from perfect books, and means for detecting variations in thickness while the signatures are being gathered, said means controlling the separating and receiving means.

17. In combination, a conveyer, sorting mechanism adapted to receive products from the conveyer, detector mechanism for detecting variations from a predetermined thickness of product, interrupting means traveling in synchronism with the products, the detector adapted to influence the interrupting means so that when the defective book or product reaches the sorting mechanism, the interrupting means will cause the sorting mechanism to separate the defective product from the perfect product.

18. In combination, a plurality of hoppers, a conveyer divided into compartments and adapted to receive signatures from the hoppers, detectors for each hopper for detecting variance in the thickness of the signatures, a sorting mechanism adapted to receive the books from the conveyer, actuating means for the sorting mechanism, interrupting mechanism between the detectors and sorting mechanism traveling in synchronism with the conveyer, said interrupting mechanism having members corresponding to the compartments of the conveyer and adapted to be acted upon by the detectors, said members when so acted upon, affecting the actuating means to cause the sorting mechanism to separate the defective books from the perfect books.

19. In combination with a signature gathering machine, a conveyer for the signatures, detectors for detecting signatures of improper thickness, sorting mechanism to receive the books from the conveyer, and means adapted to be acted upon by the detectors, said means traveling in synchronism with the conveyer to cause actuation of the sorting mechanism to separate the defective books from the perfect ones.

20. In combination, a sorting mechanism, means for delivering articles to the sorting mechanism, actuating means for said mechanism causing it to normally deliver the product received to one channel, means for detecting variation in the thickness of the article or entire absence of the article before reaching the sorting mechanism, normally inoperative interrupting means traveling between the detector and the actuating means and the motion of which is in synchronism with the article delivering means, and means controlled by the detecting means for rendering the interrupting means operative to thereby cause the sorting mechanism to deliver the product of improper thickenss to another channel.

21. In combination, a sorting mechanism, means for delivering articles to the sorting mechanism, actuating mechanism normally causing the sorting mechanism to make one disposition of the products, means for detecting variation in the thickness of the articles before they reach the sorting mechanism, interrupting means for the actuating mechanism traveling between the detecting means and the sorting mechanism normally inoperative and the movement of which is in synchronism with the article-delivering means, and means rendering the interrupting means operative when a defective article is detected so as to affect the actuating mechanism to cause the sorting mechanism to make another disposition of the products of improper thickness.

22. In combination with a signature gathering machine, a conveyer, a receiving trough disposed at right angles to the conveyer, a sorting blade reciprocating in said trough so as to engage with the product received from the conveyer to move it in one direction or the other depending upon the position of the blade when the product is received in the trough, means for reciprocating said sorting blade, means for detecting products of improper thickness before they reach the receiving trough, and means acted upon by the detecting means and traveling in synchronism with the delivering means to affect the reciprocating means of the sorting blade to cause said blade to deliver the defective products to one end of the trough and the perfect products to the opposite end of the trough.

23. In combination, a signature gathering mechanism, a sorting mechanism adapted to receive the books from said gathering mechanism, a reciprocating member in the sorting mechanism acting to normally deliver the books in one direction, a plurality of means to detect signatures of improper thickness, and means controlled by the detecting means for varying the timing of the reciprocating member to separate the signatures of improper thickness from the perfect books.

24. A sorting mechanism comprising a receiving trough, a sorting blade reciprocating in said trough, means for reciprocating the blade, means for delivering articles to the trough, controlling means for varying the time of the reciprocating means and means for operating said controlling means, whereby said blade will deliver certain of said articles to one end of the trough and certain other of said artciles to the opposite end of the trough.

25. In combination, a sorting mechanism, actuating means to normally cause said mechanism to deliver articles received, in one direction, an interrupting means, and means controlled by the interrupting means to vary the timing of the actuating means so as to deliver said articles in another direction.

26. In combination with a signature gathering machine, a delivery mechanism comprising a receiving member adapted to receive the product from the signature gathering machine at a certain point, a separating member adapted to travel back and forth past the point at which the product is received and capable of delivering the product in opposite directions, and actuating means for said member capacitated to variably position the separating member with reference to the product received at the moment it is received, such position of the separating member with reference to the product determining the direction in which the product is delivered.

27. In combination with a conveyer and a receiving member to receive products from the conveyer at a certain point, a sorting member, actuating means for reciprocating the sorting member past the point at which the products are received, the conveyer and sorting member being normally so timed that the products will normally be received on one side of the sorting member and be normally delivered by the sorting member in one direction, and means acting under certain conditions to change the timing of the sorting member so that the product will be received on the opposite side of the sorting member and be deposited in a different direction from the normal, and to again cause the sorting member to resume its normal operation.

28. In combination with a longitudinally traveling member and driving elements carried thereby, a shaft and a dog on said shaft in position to be engaged by the driving elements to cause rotation of the shaft, a cam on the shaft, a trip member positioned by the cam, a driving and a driven member, delivery mechanism operated by the driven member, dogs forming a driving connection between the driving and driven members, the trip member adapted to be actuated by the cam to trip the last mentioned dogs to change the driving connection between the driving and driven members.

29. In combination with a member carrying movable driving elements, means for positioning the driving elements, a shaft, a dog on said shaft in position to be engaged by the driving elements when properly positioned to rotate the shaft, a cam on the shaft, a driving and a driven member, delivery mechanism operated by the driven member, dogs carried by the driving member and mounted to engage the driven member, and a trip member positioned by the cam to affect the individual dogs to cause each of the dogs individually at different times to serve as the driving connection between the driving and driven elements.

30. A delivery mechanism, a driven member for operating the same, a driving member, a pair of dogs carried by the driving member, oppositely disposed seats on the driven member to be engaged by the respective dogs, means tending to hold the dogs in engagement with the driven member, a shaft, a cam on said shaft, a trip member controlled by the cam and normally acting to free one of the dogs from the driven member to cause the other dog to drive said driven member, a dog on the shaft, an interrupting member having elements to engage the dog on the cam shaft to rotate said shaft, the trip member being so located by the cam, when the cam shaft is rotated, as to trip the active dog and permit the other dog to become active.

31. In combination with a member carrying movable driving elements, means for positioning the driving elements, a shaft, a dog on the shaft adapted to be engaged by the driving elements when they are properly positioned to rotate the shaft, a cam on the shaft, a trip member controlled by said cam, a driving and a driven member, a clutch connection between the two controlled by the trip member, delivery mechanism operated by the driven member, and means for restoring the driving elements to their original position after such elements have acted upon the dog on the cam shaft to rotate said shaft.

32. In combination, a substantially horizontal trough, a conveyer adapted to discharge articles to said trough at a definite time and at a certain point, a separating member, means for reciprocating said separating member past the point of delivery to the trough, and means for varying the timing of the separating member with respect to the delivery point of the article to the trough.

33. In combination with a conveyer and a member to receive products from the conveyer at a certain point, a sorting member, actuating means for reciprocating the sorting member past the point at which the products are received, the conveyer and sorting member being normally so timed that the products will normally be received on one side of the sorting member and be normally delivered by said sorting member in one direction, and means acting under certain conditions to change the timing of the parts so that the product will be received on the opposite side of the sorting mechanism and be moved in a direction different from the normal.

34. Delivery mechanism comprising a receiving member adapted to receive the product to be delivered at a certain point, a sorting member, actuating means for reciprocating the sorting member past the point at which the products are received so timed as to normally deliver the products to one side in the receiving member, and means exercising a control over said actuating means to change the timing of the sorting member and thus cause the products to be delivered in a direction opposite to that of the normal delivery.

35. In combination, a receiving member, means for conveying products to said receiving member at a certain point, a sorting member, actuating means for reciprocating the sorting member past the point at which the products are received, the sorting member and the product-conveying means being normally so timed that the products will ordinarily be received on one side of the sorting member and be normally delivered by said sorting member in one direction, and means adapted to change the timing of the parts so that the product will be received on the opposite side of the sorting member and will be thereby moved in a direction different from the former direction.

36. In combination with a signature gathering machine provided with means for detecting variations from a predetermined thickness in the signatures handled thereby, a receiving member, means for conveying the products from the signature gathering machine to the receiving member, a sorting member, actuating means for reciprocating said sorting member past the point at which the products are received in the receiving member, and means under the control of the detector mechanism of the signature gathering machine for varying the timing of the actuating mechanism to control the direction in which the product shall be delivered by the sorting member.

37. In combination with a signature gathering machine provided with means for detecting variations in the thickness of the signatures handled thereby, a sorting mechanism, means for conveying the books from the signature-gathering machine to the sorting mechanism, actuating means for the sorting mechanism, and means under the control of the detector mechanism of the signature gathering machine arranged to control the actuating means to cause the sorting mechanism to separate the books containing signatures of improper thickness from the other books.

38. In combination, a signature gathering machine including a book conveyer and means for detecting variations from predetermined thicknesses of signatures, a sorting mechanism arranged to receive the books from the book conveyer, interrupting means moving in synchronism with the book conveyer, arranged to be operatively affected by the detecting means upon the detection of an abnormal thickness of any signature, and connection between the interrupting means and the sorting mechanism to cause the sorting mechanism to separate the books containing signatures of improper thickness from the other books.

39. In combination, a signature gathering machine including means for detecting variations from predetermined thicknesses of signatures, a sorting mechanism, means for conveying the gathered signatures from the signature gathering machine to the sorting mechanism, a stitcher interposed between the signature gathering machine and sorting mechanism, controlling means arranged to be operatively affected by the detector mechanism of the signature gathering machine, and connection between said controlling means and the sorting mechanism to cause said sorting mechanism to separate the books containing signatures of improper thickness from the other books.

Signed at New York, borough of Manhattan, in the county of New York and State of New York this 6th day of August A. D. 1908.

CHAS A. JUENGST.

Witnesses:
AXEL V. BEEKEN,
GEO. A. MARSHALL.